United States Patent [19]

Ono et al.

[11] Patent Number: 5,147,105
[45] Date of Patent: Sep. 15, 1992

[54] WELT SYSTEM FOR AUTOMOTIVE VEHICLE

[75] Inventors: Tomohisa Ono; Hitoshi Takahashi; Toshiaki Yamaguchi, all of Chiba, Japan

[73] Assignee: Kinugawa Rubber Industrial Co., Ltd., Chiba, Japan

[21] Appl. No.: 751,154

[22] Filed: Aug. 28, 1991

[30] Foreign Application Priority Data

Aug. 31, 1990 [JP] Japan ................................ 2-231209

[51] Int. Cl.$^5$ ............................................. B60J 5/04
[52] U.S. Cl. ................................ 296/146 F; 296/202; 49/491; 49/495; 49/497; 52/208
[58] Field of Search ......................... 296/202, 93, 146; 49/490, 491, 495, 497, 498; 52/208

[56] References Cited

U.S. PATENT DOCUMENTS

| | | | |
|---|---|---|---|
| 4,232,081 | 11/1980 | Pullan | 49/495 |
| 4,653,801 | 3/1987 | Shirasu et al. | 296/202 |
| 4,678,227 | 7/1987 | Castangno | 49/495 |
| 5,054,241 | 10/1991 | Mishima et al. | 49/497 |
| 5,072,546 | 12/1991 | Ogawa | 49/491 |

Primary Examiner—Robert R. Song
Attorney, Agent, or Firm—Bachman & LaPointe

[57] ABSTRACT

A weatherstrip system disposed on a body flange of a vehicle at a location facing the door system of the vehicle to establish a seal between the body flange and the door system when the door system is closed comprises a frame member formed of a resin material adapted to clamp the flange of the frame member, an additional layer formed of co-extrudable material laid on a surface of the frame member, and a sealing member joined to the surface of the additional layer for contacting the door system for establishing the sealing between the body flange and the door system. The additional layer is co-extruded with the frame member. An edge line of the sealing member is presented on the additional layer and is colored with the color of the layer to enhance the outer appearance of the edge line.

11 Claims, 2 Drawing Sheets

WELT SYSTEM FOR AUTOMOTIVE VEHICLE

BACKGROUND OF THE INVENTION

1. Field of The Invention

The present invention relates generally to a weatherstrip system installed on a body flange of a vehicle which faces the door system of the automotive vehicle. Specifically, the present invention relates to such a weatherstrip system having a sealing member fixed on a frame.

2. Description of The Background Art

Generally, in an automotive vehicle, a weatherstrip system is installed on a flange portion of the body of the vehicle in a position proximate to and facing a door system for establishing a seal between the flange portion and the door system. The weatherstrip system acts concurrently as a trimming member and a sealing member to seal the interior of the vehicle from environment. In these days, such a weatherstrip system comprises frame member formed of resin fixed to the body flange so as to clamp the flange in the frame member and a sealing member formed of a sponge rubber which adheres to an outer surface of the frame member which is exposed to the ambient environment to contact with a surface of a door flange, has been utilized in the automotive vehicle. The frame member includes a U-shaped substrate and a core metal embedded in the substrate. A cover lip extends from the surface of the frame member into the interior of the vehicle and covers a flange portion of a roof rail. A stopper is disposed at an inner surface of the bent area of the U-shaped substrate to clamp the body flange therein. The sealing member is connected with the frame and comprises a hollow lip extending from the exposed surface of the sealing member toward the door system to form a seal between the body flange and the door system when the door is closed. The frame member is formed of a resin material having a similar color to the interior of the vehicle, such as the roof, for enhancing the appearance of the frame member with the vehicle interior. The sealing member is formed of the sponge rubber having a black color. The frame member and the sealing member are joined together via an adhesive after respective forming thereof.

The weatherstrip system having a structure as set forth is installed at a prominent position in the vehicle, treatments for enhancing the outer appearance thereof have been desired so as to obtain an improved appearance of the system which functions as a trimming system.

Japanese Patent First Publication (not allowed) No. 63-240445 discloses a weather strip having a frame member formed of a resin and a sealing member formed of a rubber. An escape slit for excess amount of an adhesive is formed on facing surfaces of both members respectively. Therefore, an outer appearance of the strip cannot be deteriorated in spite of the adhesive cannot be constantly applied to the surface of both members.

Japanese Utility Model First Publication (not allowed) No. 1-60954 also discloses a weather strip having a frame member and a sealing member formed of materials similar as aforementioned. An element extends from the frame member, corresponding to an edge portion where the sealing member is adhered, toward the sealing member to cover a seam on the surface of both. The element is formed integral with the outer surface of the frame member to raise the appearance of the seam. Therefore, an outer appearance of the strip is not deteriorated if the adhesive is protruded from the seam, or if positioning of both members is slipped out during manufacturing.

However, there remains a further problem in view of enhancing the appearance. Conventionally, the frame member and the sealing member of the weatherstrip system as aforementioned are joined together after forming. The operation during the adhering step of the members tends to be uneven. Additionally, the frame member has a nonuniform surface due to the embedded core metal. Alternatively, the sectional surface of the sealing member frequently becomes rough. It is impossible to prevent such occurrences during manufacturing. Thus, boundary line between the frame member and the sealing member tends to be rough. This cause deterioration of the outer appearance of the system.

SUMMARY OF THE INVENTION

It is therefore a principal object of the present invention to provide a weatherstrip system wherein deterioration of the outer appearance thereof is prevented.

It is another object of the present invention to provide a weatherstrip system wherein rough boundary lines are avoided where the sealing member joins to the frame member.

It is a further object of the present invention to provide a method for forming a weatherstrip system having good overall appearance.

In order to accomplish the aforementioned and other objects, a weatherstrip system is disposed on a body flange of a vehicle in a position facing the door system of the vehicle so as to establish a seal between the flange and the door system when the door system is closed. The weatherstrip system is composed of a first member extending lengthwise along the body flange to clamp the flange in the first member, a second member laid on a surface of the first member corresponding to a position which is exposed to ambient environment being laid along the first member in a lengthwise direction, and a third member joined to the surface of the second member to contact with the door system for establishing a seal between the body flange and the door system, wherein a favorable edge line between the third member and the second member is presented.

The second member is protectively colored with the color of the third member to enhance the outer appearance thereof.

The width of the second member may be formed broader than that of the third member.

The second member can be co-extruded with the first member.

The first member may be formed of a resin having a color being balanced with that of the vehicle adjacent the first member, the third member may be formed of a rubber having a different color from that of the first member, and the second member may be formed of a co-extrudable material with the first member.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
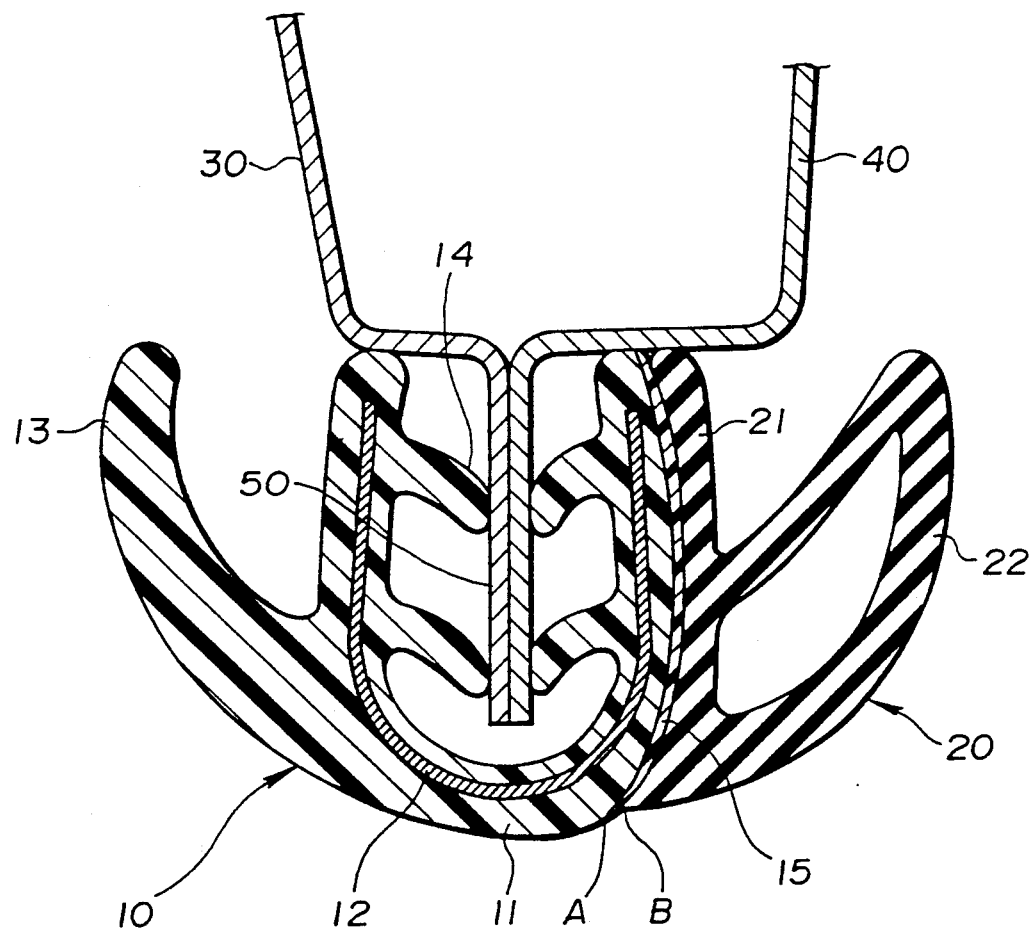
FIG. 1 is a sectional view of a welt system according to the present invention.

Referring now to the drawings, particularly to FIG. 1, a weatherstrip system is composed of a frame member 10 formed of a resin and a sealing member 20 formed of a sponge rubber. An end of a roof side rail having an inner surface 30 and an outer surface 40 are fastened to each other to form a body flange 50 clamped by a U-shaped substrate 11 of the frame member 10. A core metal 12 is embedded in the substrate 11 to reinforce it and urged the clamping effect. A cover lip 13 extends from the substrate 11 toward the interior of an automotive vehicle (not shown in the figure) to cover an exposed inner surface of the roof side rail 30. A plurality of stoppers 14 are disposed on the inner surface of the substrate 11 to clamp the flange 50 therein.

The sealing member 20 has a facing wall 21 connected with the surface of the member 10 opposite to that of the cover lip 13 is extended. A hollow lip 22 extends from the facing wall 21 toward ambient environment where it contacts with a door system (not shown in the figure).

Figure 2:
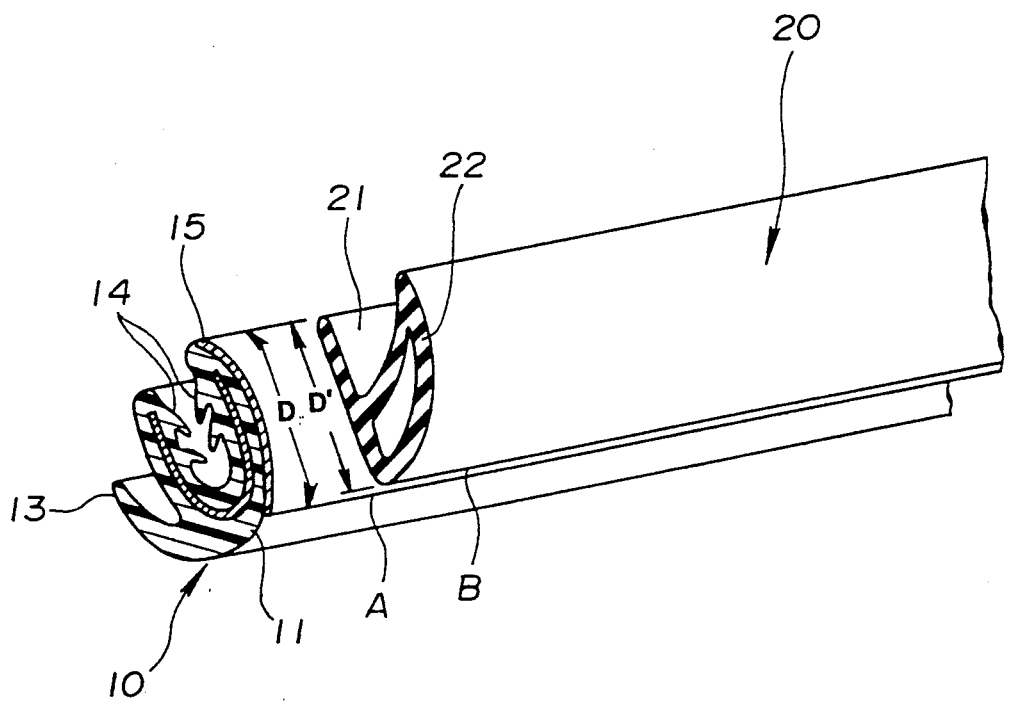
FIG. 2 is a perspective view of a welt system of FIG. 1.

The frame member 10 is generally colored with a similar color to that of the vehicle interior, for example, the color of the roof, so as to be balanced therewith. An additional layer 15 having the same color as the sealing means 20 is laid on the outer surface of the frame member 10 where it faces the facing wall 21 of the sealing means 20, in a lengthwise direction on the frame member 10. The layer 15 is formed by double extrusion with the frame member 10 during extrusion molding. As shown in FIG. 2, the width D of the layer 15 is formed to be broader than the mean width D' of the sealing member 20. The sealing member 20 is joined to the surface of the layer 15, keeping a minimum distance from an edge line A of the layer 15. Therefore, an edge line B of the sealing member 20 is positioned on the surface of the layer 15. As the edge line B has the same color as the layer 15, the edge line B becomes inconspicuous. On the other hand, the edge line A of the layer 15 attracts notice. However, because the layer 15 is formed concurrently with the frame member 10 during extrusion, waving of the edge line A is held to a minimal level. Accordingly, the outer appearance of the weatherstrip system due to the edge line A is not detracted.

Accordingly, in the present invention, waving of the edge line formed by adhesion of the frame member and the sealing member becomes inconspicuous as it is formed by the surface of the additional layer extruded with the frame member, having the same color of the sealing member. Therefore, the outer appearance of the weatherstrip system can be highly enhanced.

While the present invention has been disclosed in terms of the preferred embodiment in order to facilitate better understanding of the invention, it should be appreciated that the invention can be embodied in various ways without depending from the principle of the invention. Therefore, the invention should be understood to include all possible embodiments and modification to the shown embodiments which can be embodied without departing from the principle of the inventions as set forth in the appended claims.

What is claimed is:

1. A weatherstrip system disposed on a body flange of a vehicle for providing a seal between the door flange and a door system of the vehicle when the door system is closed, comprising:
    a first member extending in a lengthwise direction along the body flange so as to clamp the flange in said first member;
    a second member fixed to a surface of the first member at a location which is exposed to ambient environment, the second member being laid in a lengthwise direction on the first member; and
    a third member joined to the surface of said second member for contact in the door system for establishing the seal between the body flange and the door system, so that an edge line of the third member is established on the second member, wherein the second member is colored with the color of the third member to enhance the outer appearance thereof.

2. A weatherstrip system as set forth in claim 1, wherein the width of the second member is broader than that of the third member.

3. A weatherstrip system as set forth in claim 1, wherein the second member is co-extruded with the first member so as to join the members together.

4. A weatherstrip system as set forth in claim 1, wherein the first member is formed of a resin having a color complimentary with that of the vehicle adjacent the first member.

5. A weatherstrip system as set forth in claim 1, wherein the third member is formed of a rubber having a different color from that of the first member.

6. A weatherstrip system as set forth in claim 1, wherein the second member is formed of a co-extrudable material with the first member.

7. A method for forming a weatherstrip system to be disposed on a body flange of a vehicle for providing a seal between the door flange and a door system of the vehicle when the door system is closed, comprising the steps of:
    co-extruding a first member having a structure for clamping the body flange therein with a second member such that said first member is fixed to the second member;
    positioning a third member having the color of the second member on a surface of the second member so as to present an edge line of the third member thereon; and
    joining the third member on the surface of the second member whereby said second member contacts the door system for establishing a seal between the body flange and the door system, wherein the second member is colored with the color of the third member to enhance the outer appearance thereof.

8. A method for forming a weatherstrip system as set forth in claim 7, wherein the width of the second member is formed broader than that of the third member.

9. A method for forming a weatherstrip system as set forth in claim 7, wherein the first member is formed of a resin having a color complementary with that of the vehicle adjacent the first member.

10. A method for forming a weatherstrip system as set forth in claim 7, wherein the third member is formed of a rubber having a different color from that of the first member.

11. A method for forming a weatherstrip system as set forth in claim 7, wherein the second member is formed of a co-extrudable material with the first member.

* * * * *